(12) United States Patent
Song et al.

(10) Patent No.: US 6,567,064 B1
(45) Date of Patent: May 20, 2003

(54) LIQUID CRYSTAL DISPLAY DEVICE

(75) Inventors: Byung Chan Song, Kyoungsan-shi (KR); Kwang Gyun Park, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 210 days.

(21) Appl. No.: 09/665,109

(22) Filed: Sep. 20, 2000

(30) Foreign Application Priority Data

Sep. 21, 1999 (KR) .............................................. 99-40815

(51) Int. Cl.[7] ................................................. G09G 3/36
(52) U.S. Cl. ......................... 345/94; 345/100; 349/149
(58) Field of Search ............................... 345/87, 95, 50, 345/51, 42, 90, 92, 94, 100, 211, 212; 349/142, 149, 151, 152

(56) References Cited

U.S. PATENT DOCUMENTS 5,825,442 A * 10/1998 Yoneda et al. ................ 349/95
5,831,605 A * 11/1998 Yasui et al. .................. 345/211
6,177,974 B1 * 1/2001 Hirakata et al. ............. 349/155
6,181,393 B1 * 1/2001 Enomoto et al. .............. 349/86
6,204,545 B1 * 3/2001 Nakata ......................... 257/459
6,229,510 B1 * 5/2001 Kim et al. ..................... 345/87
6,392,626 B1 * 5/2002 Moon ........................... 345/94

* cited by examiner

*Primary Examiner*—Steven Saras
*Assistant Examiner*—Fritz Alphonse
(74) *Attorney, Agent, or Firm*—McKenna Long & Aldridge LLP (57) ABSTRACT

A liquid crystal display device that is adapted to reduce flicker. In the device, a plurality of common voltage lines are formed into a spherical shape on a lower substrate to deliver a common voltage to an upper substrate. A plurality of link points are formed between the common voltage delivering lines to deliver the common voltage to a transparent electrode film. A plurality of links are provided between the link points to have a different resistance value. Accordingly, a flicker is prevented to improve a picture quality.

28 Claims, 7 Drawing Sheets

LIQUID CRYSTAL DISPLAY DEVICE

This application claims the benefit of Korean Patent Application No. 1999-40815, filed on Sep. 21, 1999, which is hereby incorporated by reference for all purposes as if fully set forth herein.

BACKGROUND OF THE INVENTION

1. Field of the Invention

The present invention relates to a liquid crystal display, and more particularly to a liquid crystal display device that is adapted to reduce flicker.

2. Discussion of the Related Art

Generally, a liquid crystal display (LCD) includes a liquid crystal panel and drive circuitry for driving the liquid crystal panel. A lower substrate of the liquid crystal panel is provided with switching devices (i.e., a thin film transistor array) for individually switching signals applied to liquid crystal cells. A gate terminal of the switching device is connected to a gate driver while a source terminal thereof is connected to a source driver. A drain terminal of the switching device is connected to a pixel electrode. A common voltage Vcom is applied to a common electrode of an upper electrode of the liquid crystal panel. Liquid crystal cells arranged in a matrix type are provided between the upper substrate and the lower substrate.

The gate driver applies a scanning signal sequentially to each gate line under control of the driving circuit. The source driver applies an image signal to each data line under control of the driving circuit. When an image signal is applied to a thin film transistor (TFT) turned on by a scanning signal, the image signal moves through the source terminal and the drain terminal onto a pixel electrode. At this time, the orientation of a liquid crystal cell is controlled by a voltage difference between an ITO (indium-tin-oxide) film supplied with the common voltage Vcom and the pixel electrode supplied with an image signal.

Figure 1:
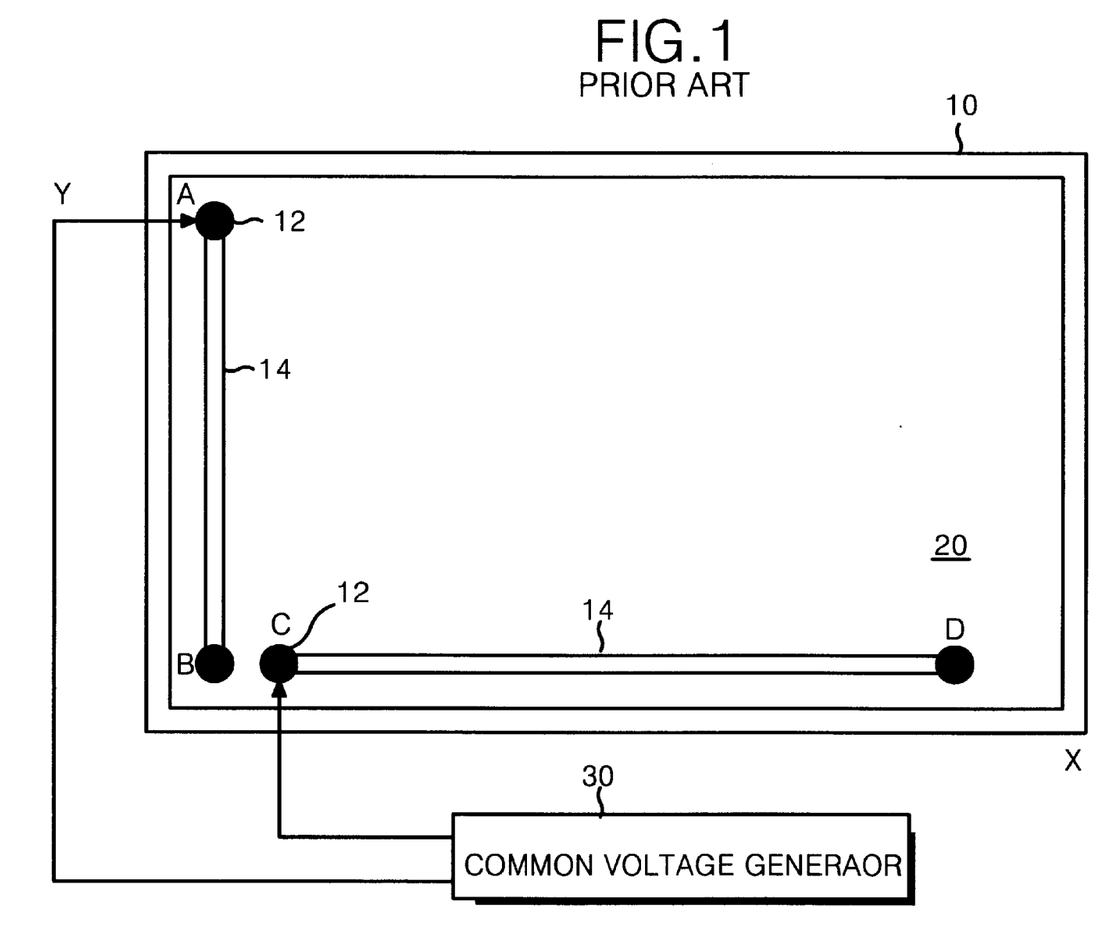
FIG. 1 is a view for explaining a process of delivering a common voltage in a conventional liquid crystal display.

Referring to FIG. 1, a conventional LCD includes an ITO film 20 supplied with a common voltage Vcom from a common voltage generator 30 via Ag dots 12 provided on a lower substrate 10. Conductive patterns 14 are provided between the Ag dots 12. The liquid crystal panel is usually provided with at least two common voltage lines as shown in FIG. 1. The Ag dots 12 typically have a spherical shape, are conductive, and are provided at locations A, B, C and D position on the lower substrate 10. The ITO film 20 is arranged on the upper portion so as to apply the common voltage over the display. The common voltage Vcom applied from the common voltage generator 30 to the liquid crystal panel is delivered, via the Ag dots 12, to the ITO film 20.

Figure 2A:
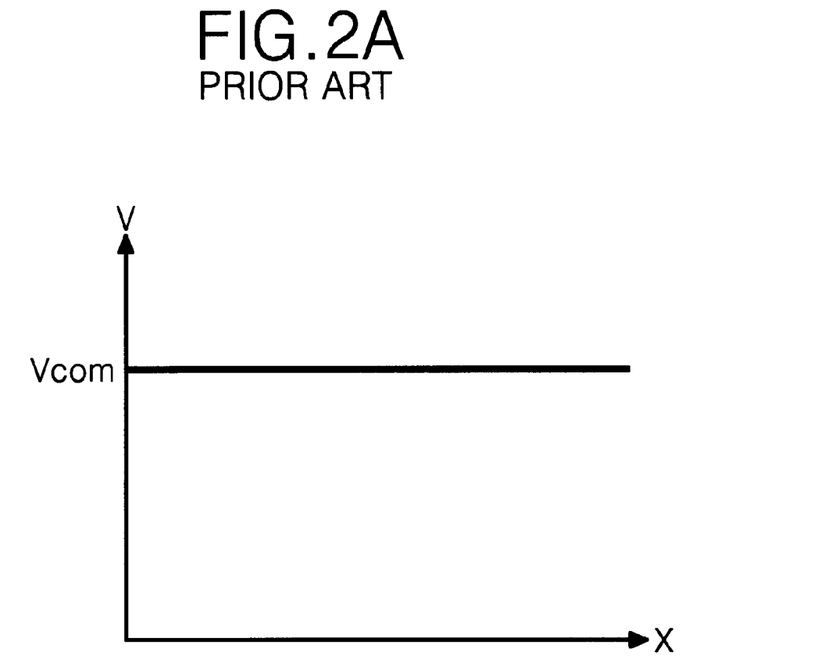
FIGS. 2A and 2B are waveform diagrams of the common voltage applied to a conventional liquid crystal display panel.
Figure 2B:
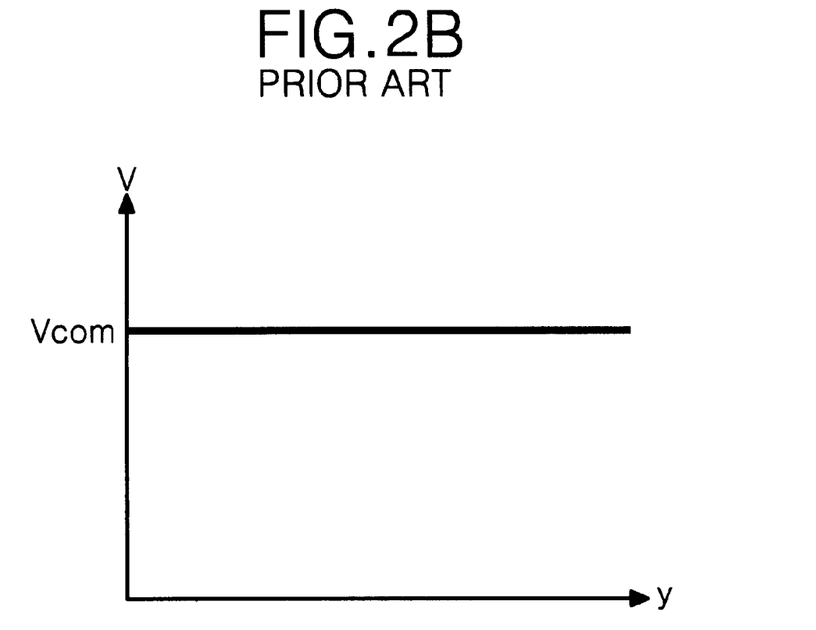

Assuming that the conductive pattern linking the C position with the D position, hereinafter referred to as "C-D line", makes an X axis, the level of the common voltage Vcom applied to the X axis is shown in FIG. 2A. Also, assuming that the conductive patternn linking the A position with the B position, hereinafter referred to as "A-B line", makes a Y axis, the level of the common voltage Vcom applied to the Y axis is shown in FIG. 2B. As can be seen from FIG. 2A and FIG. 2B, the common voltages applied from the common voltage generator 30 to the X and Y axes of the lower substrate 10 are the same. When the ITO film 20 has a low resistance, a common voltage having a uniform level is formed across the entire panel. However, signals from gate driving integrated circuits (IC's) and from source driving IC's of the data driver have line delays caused by wire resistance and parasitic capacitance. More specifically, scanning signals from gate driving IC's and data signals from source driving IC's encounter a wire resistance that depends on the shape of the conductive pattern 14, its material, length, width and thickness. Also, said signals are impacted by the capacitances of the gate electrodes, the capacitance between the electrodes of the liquid crystal cell, the capacitance value between the conductive pattern 14 and the data signal wire and a stray capacitance around the conductive pattern that form a parasitic capacitor. For this reason, electric charges in pixel cells located at the A and B positions can be different enough to cause flicker. Also, since the common voltage Vcom is applied independently of the charge and discharge characteristics of each part of the liquid crystal display panel, the extent of the flicker is different at each part of the liquid crystal display panel. If the flicker is serious, then it becomes difficult to determine an appropriate level of the common voltage Vcom.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device that has reduced flicker.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to an embodiment of the present invention includes a common voltage delivering means being formed into a spherical shape on a lower substrate to deliver a common voltage to an upper substrate; a plurality of link points being formed between the common voltage delivering means to deliver the common voltage to a transparent electrode film; and a plurality of links provided between the link points to have a different resistance value.

A liquid crystal display device according to another embodiment of the present invention includes common voltage delivering means being formed into a spherical shape on a lower substrate to deliver a common voltage to an upper substrate; a plurality of link points being formed into a slot shape between the common voltage delivering means to deliver the common voltage to a transparent electrode film; and a plurality of links formed in a slot shape in vicinity of the respective link points to have a different resistance value.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, examples of which are illustrated in the accompanying drawings.

Figure 3:
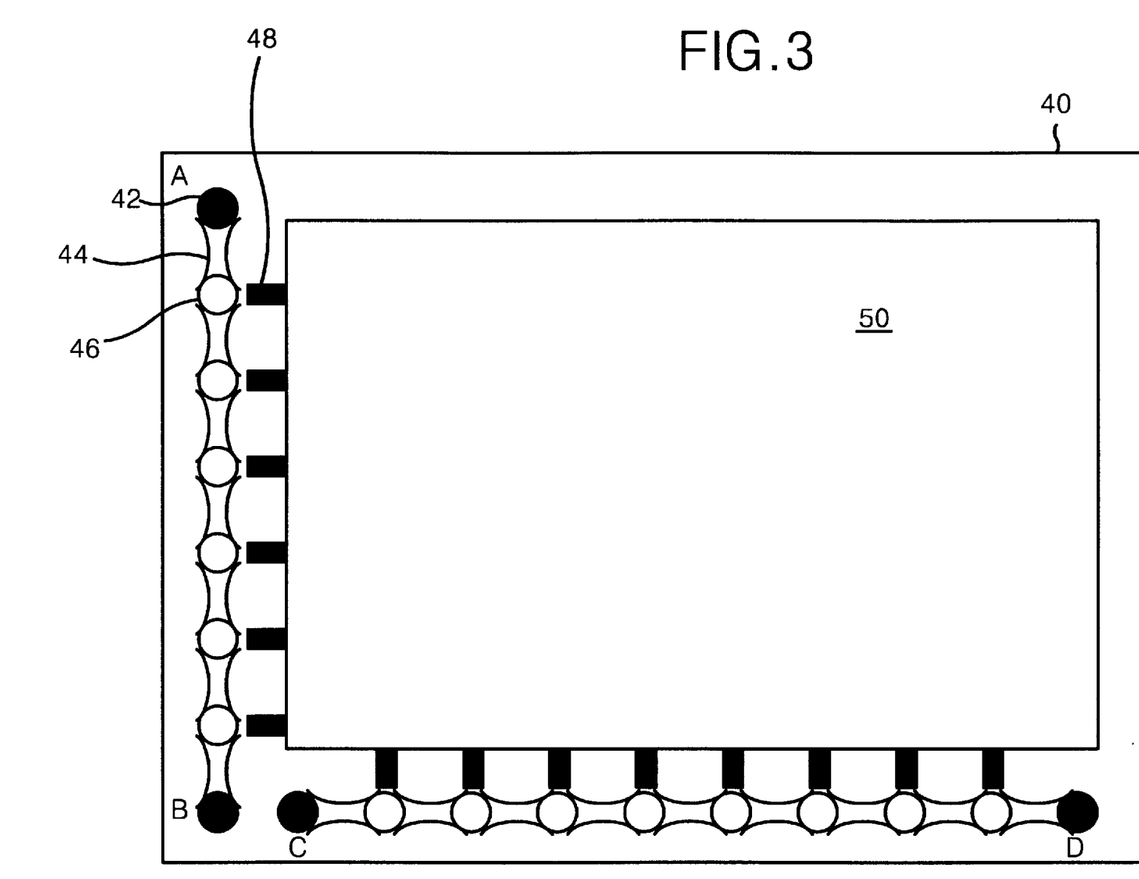
FIG. 3 is a schematic view showing a configuration of a liquid crystal display according to a first embodiment of the present invention.

Referring to FIG. 3, there is shown a liquid crystal display (LCD) according to a first embodiment of the present invention. The LCD includes Ag dots 42 formed into a spherical shape to deliver an applied voltage Vcom on a lower substrate 40. At least two link points 46 provided between the Ag dots 42 deliver the applied voltage Vcom to an ITO film 50, and links 44, provided between the link points 46, that have different resistances. The applied voltage Vcom is from a voltage generator that is not shown. That voltage is delivered, via the spherical Ag dots 42 to the links 44 and to the link points 46. Since the links 44 formed between the link points 46 have different resistance values, the levels of the voltages applied to each link point 46 also are different. In other words, voltage levels at the A position and the B position on the liquid crystal panel are different. An ITO pattern 48 is provided to obtain a conductive property between the link point 46 and the ITO film 50.

Figure 4:
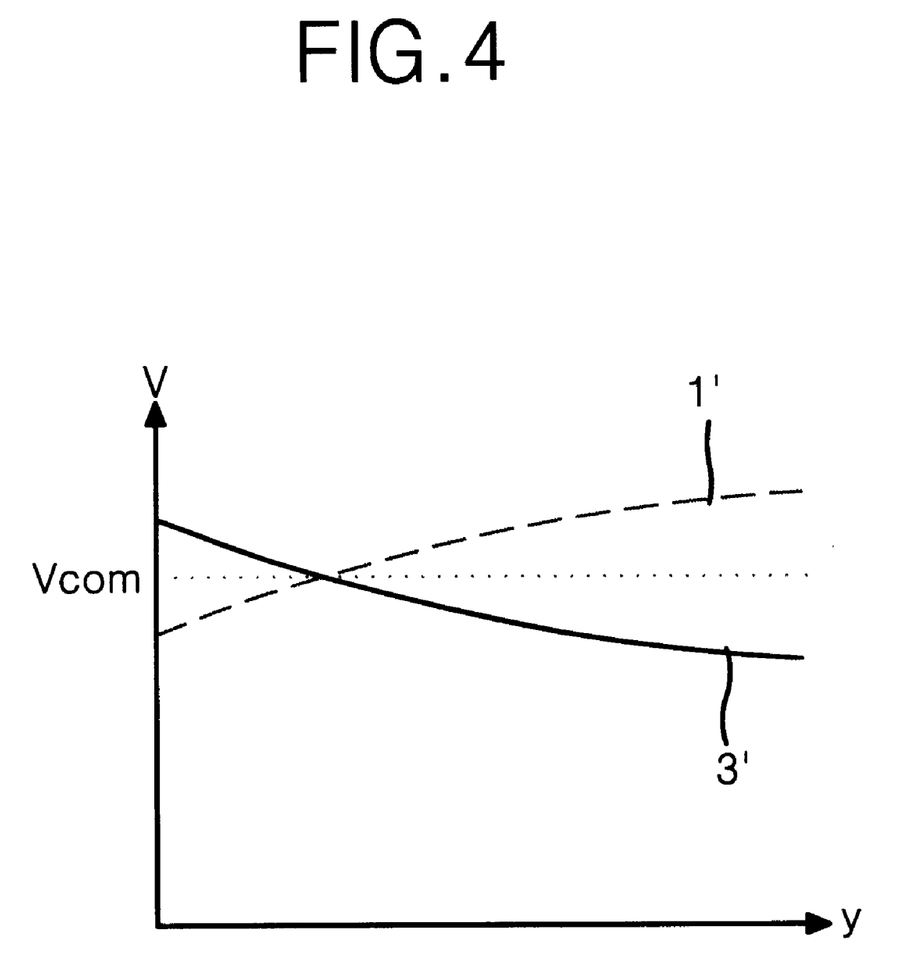
FIG. 4 is a waveform diagram of the voltage along the A-B line of a liquid crystal display illustrated in FIG. 3.

Hereinafter, a waveform according to a level variation in the common voltages along the applied voltage lines, and an electrical equivalent circuit thereof will be described in conjunction with FIG. 4 and FIG. 5. Referring to FIG. 4, there is shown an applied voltage level along the A-B line of the liquid crystal panel. At least two resistive links and link points are provided between the A position and the B position. Thus, voltage levels as shown in FIG. 4 are obtained. In FIG. 4, line 1' represents the level of the applied voltage at the A position, while line 3' represents the level of the applied voltage at the B position. A voltage level between lines 1' and 3' corresponds to the conventional common voltage level Vcom as in FIG. 2B.

Figure 5:
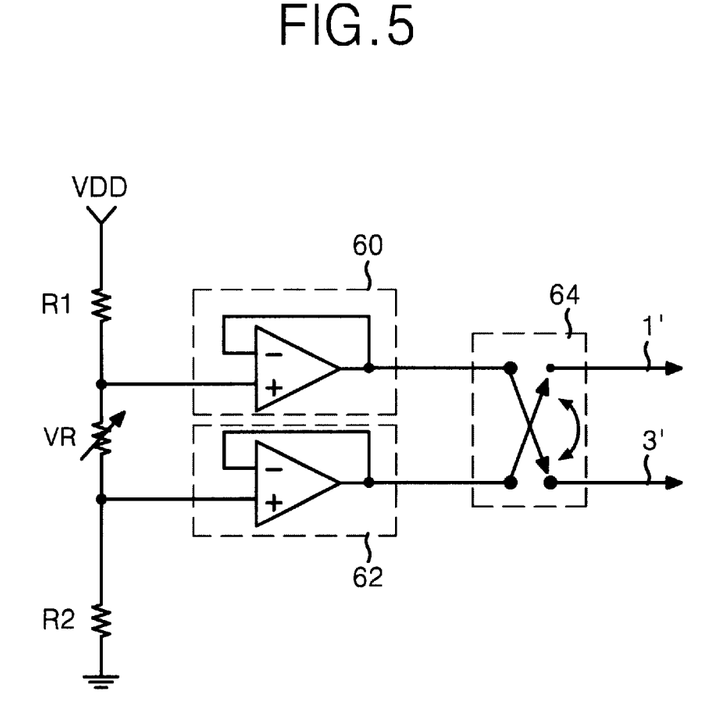
FIG. 5 is an equivalent circuit diagram of the A-B line in FIG. 3.

Referring to FIG. 5, there is shown an electrical equivalent circuit of the A-B line of the liquid crystal panel. A voltage applied from a voltage supply VDD is reduced by a first resistor R1. That voltage is applied, via a first voltage follower 60, to a switch 64. Also, the voltage applied from the voltage supply VDD is further reduced by a variable resistor VR, and is applied via a second voltage follower 62 to the switch 64. The switch 64 is turned on each time a vertical synchronizing signal Vsync is applied, so that a voltage passing through the first voltage follower 60 has a level indicated by 3' and a voltage passing through the second voltage follower 62 has a level indicated by 1'. In this case, the voltage level crosses by virtue of the switch 64. This aims at compensating for a voltage drop in the A-B line.

Figure 6:
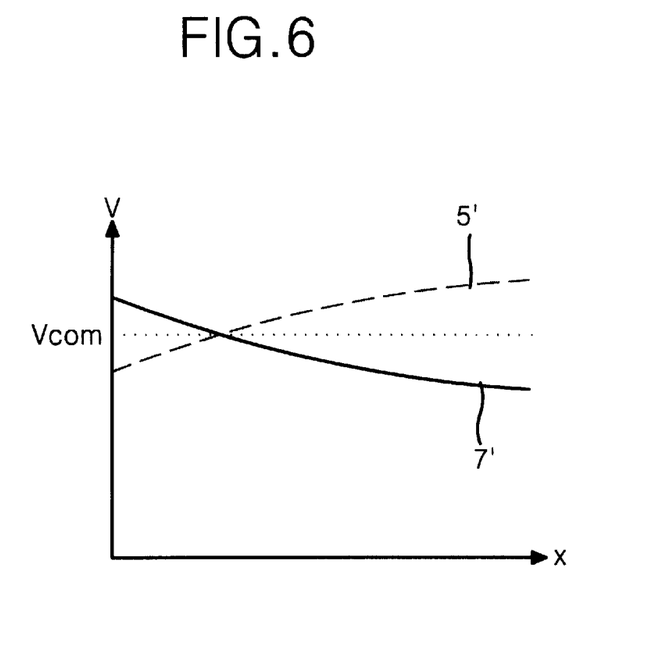
FIG. 6 is a waveform diagram of the voltage along the C-D of the liquid crystal display illustrated in FIG. 3.

Referring to FIG. 6, there is shown applied voltage levels along the C-D line of the liquid crystal panel. At least two resistive links and link points are provided between the C position and the D position. Thus, a voltage level as shown in FIG. 6 is obtained. In FIG. 6, 5' represents a level of the applied voltage at the C position while 7' represents the level of the applied voltage at the D position. A voltage level between 5' and 7' corresponds to the conventional common voltage level illustrated in FIG. 2B.

Figure 7:
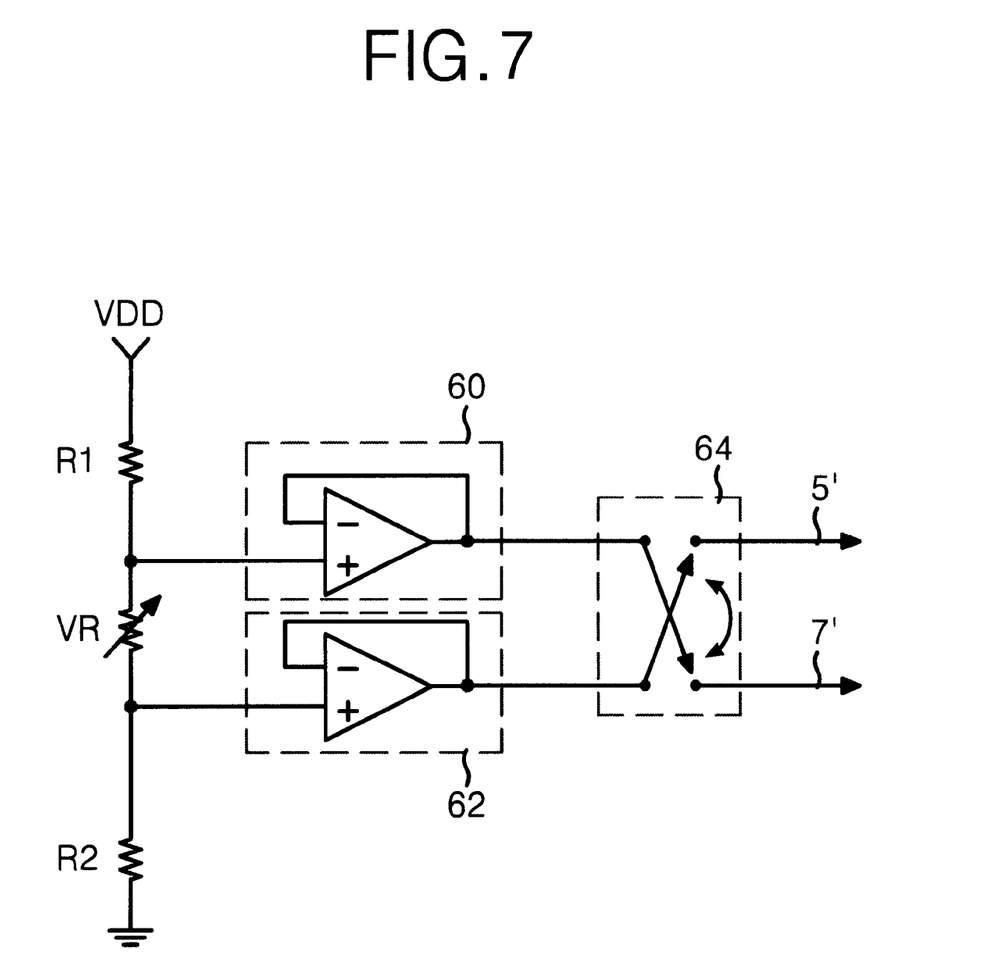
FIG. 7 is an equivalent circuit diagram of the C-D line in FIG. 3.

Referring now to FIG. 7, there is shown an electrical equivalent circuit of the C-D line of the liquid crystal panel. A voltage applied from a voltage supply VDD is reduced by a first resistor R1. That reduced voltage is applied, via a first voltage follower 60, to a switch 64. Also, the voltage from the voltage supply VDD is further reduced by a variable resistor VR, and applied via a second voltage follower 62 to the switch 64. The switch 64 is turned on each time a vertical synchronizing signal Vsync is applied, so that a voltage passing through the first voltage follower 60 has a level indicated by 7' and a voltage passing through the second voltage follower 62 has a level indicated by 5'. In this case, the voltage level crosses by virtue of the switch 64. This aims at compensating for a voltage drop in the C-D line.

Figure 8:
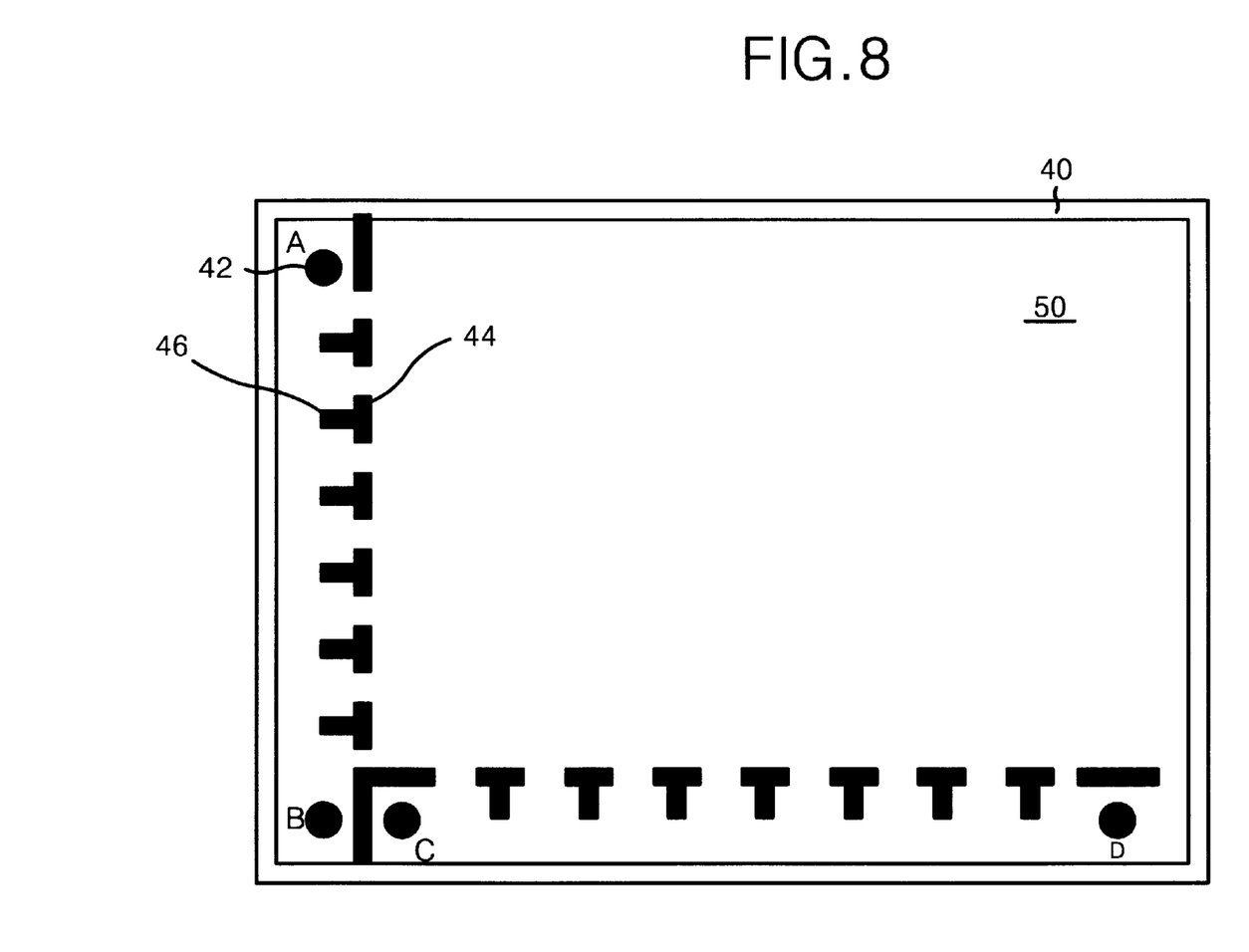
FIG. 8 is a schematic view showing a configuration of a liquid crystal display according to a second embodiment of the present invention.

Referring to FIG. 8, there is shown an LCD according to a second embodiment of the present invention. The LCD includes Ag dots 42 formed into a spherical shape to deliver an applied voltage Vcom on a lower substrate 40, and at least two link points 46 formed into a slot shape between the Ag dots 42 to deliver the applied voltage Vcom, and links 44 formed into a slot shape in the vicinity of the link points 46 to have different resistance values on an ITO film 50. Since the Ag dots 42, the links 44 and the link points in FIG. 8 have the same function and operation as those in FIG. 3, an explanation as to them will be omitted. In this case, the second embodiment of FIG. 8 has such a structure that patterns of the links 44 and the link points 46 are replaced by a slot shape, but have the same driving principle as the first embodiment. In view of a relationship between the link and the link point, the first embodiment has such a structure that the each link is provided between the link points while the second embodiment has such a structure that each link is provided in the vicinity of each link point. When the above-mentioned embodiment is applied, production thereof becomes easy and process throughput increases.

As described above, according to the present invention, a common voltage corresponding to a voltage drop is applied to each position on the liquid crystal display panel to reduce flicker, thereby improving picture quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    common voltage delivering means being formed into a spherical shape on a lower substrate to deliver a common voltage to an upper substrate;
    a plurality of link points being formed between the common voltage delivering means to deliver the common voltage to a transparent electrode film; and a plurality of links provided between the link points to have a different resistance value.

2. The liquid crystal display device as claimed in claim 1, wherein at least two links and link points are provided between the common voltage delivering means.

3. The liquid crystal display device as claimed in claim 1, wherein a transparent electrode pattern is provided between the link point and the transparent electrode film.

4. The liquid crystal display device as claimed in claim 1, wherein the upper substrate is provided with the link points, the links and the transparent electrode film.

5. A liquid crystal display device, comprising:
   common voltage delivering means being formed into a spherical shape on a lower substrate to deliver a common voltage to an upper substrate;
   a plurality of link points being formed into a slot shape between the common voltage delivering means to deliver the common voltage to a transparent electrode film; and
   a plurality of links formed in a slot shape in vicinity of the respective link points to have a different resistance value.

6. The liquid crystal display device as claimed in claim 5, wherein at least two links and link points are provided between the common voltage delivering means.

7. The liquid crystal display device as claimed in claim 5, wherein a transparent electrode film is provided with the link points and the links.

8. A liquid crystal display device, comprising:
   a lower substrate;
   an upper substrate;
   a common electrode over said upper substrate;
   spherical shaped voltage inputs on said lower substrate;
   a plurality of link points;
   a plurality of resistive links between said plurality of links points, said resistive links for voltage dividing an applied voltage so as to provide a plurality of voltages on said plurality of link points;
   electrical conductors connecting said plurality of link points to said common electrode; and
   voltage connectors connecting said spherical shaped voltage inputs to said plurality of resistive links.

9. The liquid crystal display device according to claim 8, wherein said common electrode is a transparent film.

10. The liquid crystal display device according to claim 8, wherein said electrical conductors are transparent.

11. The liquid crystal display device according to claim 8, wherein said link points are on said upper substrate.

12. The liquid crystal display device according to claim 8, wherein said spherical shaped voltage inputs are silver dots.

13. A liquid crystal display device, comprising:
   a lower substrate;
   an upper substrate having a common electrode;
   input contacts on said lower substrate;
   conductors for applying voltage applied to said input contacts to said common electrode of said upper substrate;
   a plurality of slot-shaped link points connected between said common electrode and said input contacts;
   a plurality of links formed in the vicinity of the respective link points, said plurality of links having different resistance values, said plurality of links for electrically interconnecting said plurality of slot-shaped link points and said input contacts.

14. The liquid crystal display device as claimed in claim 13, wherein said common electrode is a transparent film.

15. A liquid crystal display device, comprising:
   common voltage contacts on a lower substrate for delivering a common voltage to an upper substrate;
   a plurality of link points between the common voltage contacts for applying the common voltage to a transparent electrode film on the upper substrate; and
   a plurality of resistive links between the link points.

16. The liquid crystal display device as claimed in claim 15, wherein at least two links and two link points are provided between the common voltage contacts.

17. The liquid crystal display device as claimed in claim 15, wherein a transparent electrode pattern is provided between the plurality of link point and the transparent electrode film.

18. The liquid crystal display device as claimed in claim 15, wherein the plurality of link points and the plurality of links are on the upper substrate.

19. A liquid crystal display device, comprising:
   common voltage contacts on a lower substrate for delivering a common voltage to an upper substrate having a transparent electrode film;
   a plurality of slot shaped link points electrically disposed between the common voltage contacts for delivering voltages derived from the common voltage to the transparent electrode film; and
   a plurality of resistive links disposed between and electrically connecting the plurality of link points.

20. The liquid crystal display device as claimed in claim 19, wherein at least two links and two link points are between the common voltage contacts.

21. The liquid crystal display device as claimed in claim 19, wherein the plurality of link points and the plurality of links are on the transparent electrode film.

22. A liquid crystal display device, comprising:
   a lower substrate;
   an upper substrate;
   a common electrode over said upper substrate;
   input contacts on said lower substrate;
   a plurality of link points;
   a plurality of resistive links electrically disposed between said plurality of link points, said resistive links for voltage dividing a voltage applied across two of said plurality of resistive links so as to provide a plurality of different voltages on said plurality of link points;
   electrical conductors connecting said plurality of link points to said common electrode; and
   voltage connectors connecting said input contacts to said two of said plurality of resistive links.

23. The liquid crystal display device according to claim 22, wherein said common electrode is a transparent film.

24. The liquid crystal display device according to claim 22, wherein said electrical conductors are transparent.

25. The liquid crystal display device according to claim 22, wherein said link points are on said upper substrate.

26. The liquid crystal display device according to claim 22, wherein said input contacts are spherical shaped silver dots.

27. A liquid crystal display device, comprising:
   a lower substrate;
   an upper substrate having a common electrode;
   input contacts on said lower substrate;

conductors for applying a voltage applied to said input contacts to said common electrode of said upper substrate;

a plurality of slot-shaped link points connected between said common electrode and said input contacts;

a plurality of resistive links formed near the respective link points, said plurality of resistive links having different resistance values, said plurality of resistive links for electrically interconnecting said plurality of slot-shaped link points.

28. The liquid crystal display device as claimed in claim 27, wherein said common electrode is a transparent film.

* * * * *